United States Patent

[11] 3,620,521

| [72] | Inventor | Thorsten Ingvar Egon Lundberg<br>Askim, Sweden |
|---|---|---|
| [21] | Appl. No. | 596 |
| [22] | Filed | Jan. 5, 1970 |
| [45] | Patented | Nov. 16, 1971 |
| [73] | Assignee | Aktiebolaget Gotaverken<br>Goteborg, Sweden |
| [32] | Priority | Jan. 14, 1969 |
| [33] | | Sweden |
| [31] | | 384/69 |

[54] MACHINE FOR FLAME CUTTING OF IDENTICAL COMPONENTS FROM A STACK OF PLATES
2 Claims, 2 Drawing Figs.

[52] U.S. Cl. .................................................. 266/23 E,
148/9, 266/23 K, 266/23 M
[51] Int. Cl. ........................................................ B23k 7/02,
B23k 7/10
[50] Field of Search ............................................ 266/23 B,
23 E, 23 D, 23 K, 23 M; 148/9

[56] References Cited
UNITED STATES PATENTS

| 3,119,724 | 1/1964 | Campbell .................... | 148/9 |
| 3,301,543 | 1/1967 | Semper ........................ | 266/23 K |
| 3,338,757 | 8/1967 | Dodge et al .................. | 266/23 K X |
| 3,351,333 | 11/1967 | Owen et al. ................... | 266/23 E |
| 3,436,067 | 4/1969 | Dodge et al. .................. | 266/23 K |

*Primary Examiner*—Frank T. Yost
*Attorney*—Pierce, Scheffler & Parker

ABSTRACT: When manufacturing identical components from a stack of plates by means of a flame cutting torch, which is movable by means of a mechanism reading information concerning the desired shape of the components from a templet, it has hitherto been impossible to cut components from two plates placed on top of each other, because the flame will spread out between the plates in such a manner that the component cut from the lower plate will not be identical with the one cut from the topmost plate. To make possible a simultaneously cutting of several plates stacked on top of each other a machine is used, which comprises a crab structure straddling the stack of plates and being movable along the same by a mechanism which keeps the vertical distance between the crab structure and the table constant during operation. The crab structure comprises two parallel beams between which the torch or torches are movable transversely in relation to the stack of plates. Each beam furthermore carries a set of rollers which by pressure fluid operated means are forced towards the topmost plate. In this manner a portion of the stack of plates on both sides of the spot where the torches work on the plates is compressed and this compressed portion will move along the stack as the crab structure is displaced.

INVENTOR
Thorsten Ingvar Egon Lundberg
By
Pierce, Scheffler & Parker
Attorneys

MACHINE FOR FLAME CUTTING OF IDENTICAL COMPONENTS FROM A STACK OF PLATES

BACKGROUND OF THE INVENTION

In many industries, especially in the shipbuilding industry, there is a need to produce a number of identical components, which usually are manufactured by flame cutting of plate material. This production will require a large space and also an expensive machinery. It has hitherto been impossible to produce a number of elements by stacking plates on top of each other and to simultaneously cut the required number of components from this stack. The reason is that the flame will spread out between the individual plates in such a manner that the edges of the components will be uneven and the components will vary in size.

The present invention proposes a machinery by means of which it will be possible to produce a number of identical components from a stack of plates, using at least one torch mounted on a crab straddling the stack and being displacable in relation thereto, said torch being guided by a suitable mechanism reading information concerning the desired shape of components from a templet.

SUMMARY OF THE INVENTION

The invention is characterized by that the crab is governed in relation to the table carrying the stacks or plates in such a manner that the vertical distance between the crab and the table is constant during operation and by that the crab is composed to two parallel beams between which at least one torch is displacable transversely in relation to the table by means of the templet reading mechanism said mechanism furthermore determining the movement of the crab along the table. Each of said beams carries a set of rollers resting of the topmost plate in the stack, and fluid pressure operated means are provided to force said rollers towards the plate.

DESCRIPTION OF THE PREFERRED EMBODIMENT

Figure 1:
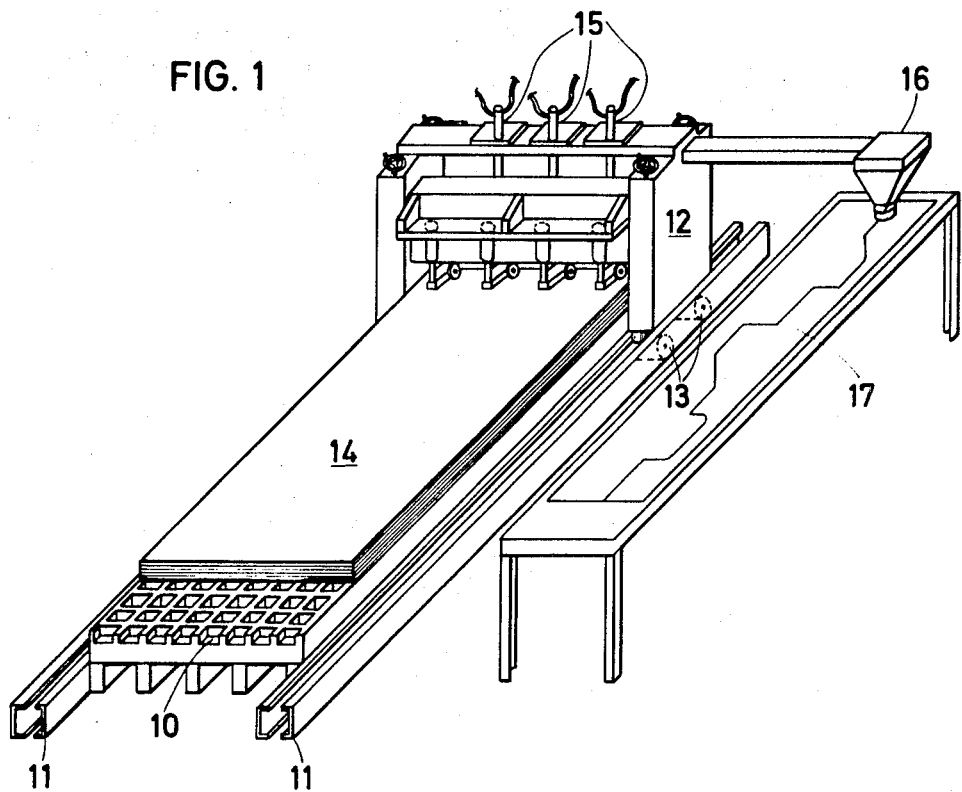
FIG. 1 shows a machine provided with three torches working in parallel.
Figure 2:
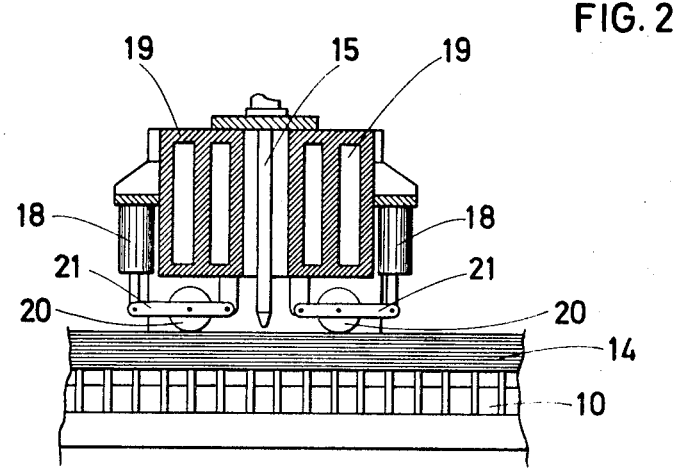
FIG. 2 is a section through the crab structure and the adjacent portions of the table.

The machine comprises an elongated table 10, designed as a grid resting on strong beams. A rail 11 adapted to carry a crab structure 12 supporting the torches runs along each longitudinal side of the table. Each rail 11 is composed of two U-beams arranged in mirror image position, with the flanges directed towards each other in such a manner that the wheels 13 carrying the crab structure can move in the space within the beams, and in an efficient manner locate the crab structure in the vertical direction with respect to the table. The latter has such dimensions that it suited to receive the sizes of plates which are intended to be worked. FIG. 1 shows a stack containing a number of plates having the same breadth as the table and about the same length as the latter. The crab structure supports three torches 15, which are movable in the crab structure transversely in relation to the table, and are operated by means of a mechanism 16, which reads information from a template 17 and moves the torches in exactly the manner the templet requires. The movements of the crab structure along the table will be determined by the cutting capacity of the torches and also by the shape of the cut. The torches are to a limited degree movable also in the longitudinal direction of the table, in such a manner that possible irregularities in the feeding will not influence the shape of the edges of the components.

The type and design of the templet reading apparatus guiding the torches forms by itself no part of the invention. A number of mechanisms are known for performing such work, and the one shown is very much simplified and is used to illustrate the desired function only. The mechanism may very well contain a photocell, which reads a photographic slide, or be governed by a punch tape.

In order to guarantee an exact shape of the components it is essential that the flame has no possibility to blow out sidewards between the plates. It must be presupposed that plates which are to be used for this highly qualified working are reasonably straight and are not contaminated by impurities on their surfaces. The portion of the stack of plates where the cutting operation is being performed will according to the invention be subjected to a considerable compression, which is brought about by a number of fluid operated rams 18.

The crab structure is compose of two strong parallel beams 19 located at a certain distance from each other sufficient to permit the mounting of the torches 15 as well as the mechanism adapted to move the latter. A number of rollers 20 are supported at each beam by means of levers 21, pivotably mounted in brackets on the beams 19. The free ends of each lever is connected to a pressure fluid operated ram 18. The compressed portion of the stack of plates will be moved along the stack as the crab structure is moved along the table, in such a manner that the part of the stack, where the torches operate, will be subjected to the very high pressure brought about by the rams 18 in conjunction with the levers 21.

What I claim is:

1. In a machine for flame cutting identical components from a stack of plates, supported on a table, by means of at least one torch mounted on a crab structure straddling said stack and movable longitudinally of said stack, the improved construction which comprises means for governing the crab structure in relation to the table in such a manner that the vertical distance between the crab structure and the table remains constant during operation;

two parallel beams in the crab structure and means to carry said torch between said beams;

a mechanism, carried by said crab structure, adapted to read information from a templet concerning the desired shape of the components and to displace said crab structure and hence said torch along said stack of plates;

a set of rollers mounted on the movable together with each beam of the crab structure; and fluid-pressure-operated means to force said rollers towards the topmost plate of the stack of plates thereby preventing lateral blowout of the torch flame between plates.

2. The improved machine according to claim 1 in which each roller is mounted on a lever, one end of which is pivotably attached to the pertaining crab structure beam, whereas the opposite end of the lever is connected to the pressure fluid operated means.

* * * * *

UNITED STATES PATENT OFFICE
CERTIFICATE OF CORRECTION

Patent No. 3,620,521  Dated November 16, 1971

Inventor(s) Thorsten Ingvar Egon Lundberg

It is certified that error appears in the above-identified patent and that said Letters Patent are hereby corrected as shown below:

Claim 1, line 16, "the" should be ---and---

Signed and sealed this 23rd day of May 1972.

(SEAL)
Attest:

EDWARD M. FLETCHER, JR.
Attesting Officer

ROBERT GOTTSCHALK
Commissioner of Patents